United States Patent
Bennington

Patent Number: 5,265,828
Date of Patent: Nov. 30, 1993

[54] CHILD SAFETY SEAT ADAPTABLE TO AIRCRAFT SEAT ATTACH POINTS

[76] Inventor: Thomas E. Bennington, 2500 Lake in the Woods, #A-218, Ypsilanti, Mich. 48198

[21] Appl. No.: 790,186

[22] Filed: Nov. 8, 1991

[51] Int. Cl.[5] .................. B64D 11/06; B60N 02/26
[52] U.S. Cl. ........................... 244/122 R; 244/118.6
[58] Field of Search .............. 244/118.6, 122 R; 297/250, 254, 345, 350, 357, 464; 248/503.1; 280/30, 31; 296/64

[56] References Cited

U.S. PATENT DOCUMENTS

| | | | |
|---|---|---|---|
| 3,331,633 | 7/1967 | Kovacevich | 297/357 |
| 3,404,917 | 10/1968 | Smith | 297/250 |
| 3,515,431 | 6/1970 | Grady | 297/250 |
| 3,865,433 | 1/1975 | Stafford | 297/390 |
| 4,067,608 | 1/1978 | Von Wimmersperg | 297/216 |
| 4,113,306 | 9/1978 | Von Wimmersperg | 297/250 |
| 4,183,580 | 1/1980 | Johansson | 297/250 |
| 4,371,183 | 2/1983 | Dion | 297/357 |
| 4,436,341 | 3/1984 | Converse | 297/250 |
| 4,500,135 | 2/1985 | Kincheloe | 297/250 |
| 4,627,659 | 12/1986 | Hall | 297/488 |
| 4,630,324 | 12/1986 | Fligsten et al. | 5/94 |
| 4,674,800 | 6/1987 | Ensign | 297/465 |
| 4,679,749 | 7/1987 | Ryan et al. | 244/122 |
| 4,688,843 | 8/1987 | Hall | 248/503.1 |
| 4,759,311 | 7/1988 | Boyle | 119/96 |
| 4,804,230 | 2/1989 | Friedman | 297/457 |
| 4,900,086 | 2/1990 | Steward | 297/238 |
| 5,118,163 | 6/1992 | Brittian et al. | 297/254 |

FOREIGN PATENT DOCUMENTS 0235137 9/1988 Japan ................. 297/250

Primary Examiner—Michael S. Huppert
Assistant Examiner—Virna Lissi Ansley
Attorney, Agent, or Firm—Richard C. Litman

[57] ABSTRACT

A portable, temporarily installable and removable safety seat for the carriage of an infant or small child aboard an aircraft includes securing anchors which cooperate with the standard seat or cargo tiedown tracks of most passenger aircraft. The anchors permit the safety seat to be secured directly to the floor of the aircraft in the same manner as other standard seats or other articles. The safety seat may be made foldable or so the back may be removed from the bottom for more compact storage, and may be constructed of relatively sturdy but lightweight materials such as aircraft grade steel tubing or aluminum tubing. Preferably, all of the materials used in the safety seat will meet or exceed the appropriate standards for fire resistance. The preferred method of use includes positioning the safety seat upon the floor immediately in front of a standard passenger seat so that a child in the safety seat and a passenger in the standard seat will face one another, securing the safety seat to the tracks with the cooperating anchors, securing the child in the safety seat, and seating an adult in the standard seat with the legs of the passenger straddling the child and safety seat. In this manner the passenger and child may more easily interact and the child is better protected in the event of an accident due to the rearward facing arrangement of the safety seat and the shielding provided by the surrounding seats and the body of the facing passenger. The seat may also be used in the manner of other known seats by using the existing standard seat belt to hold the safety seat in place in the standard seat.

19 Claims, 3 Drawing Sheets

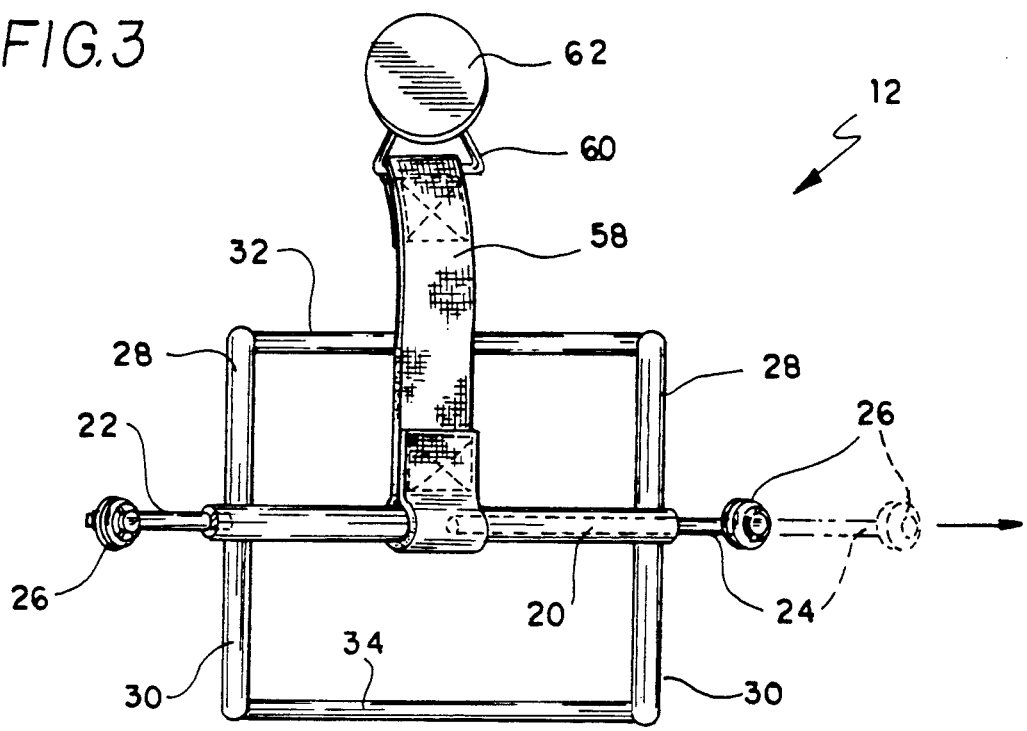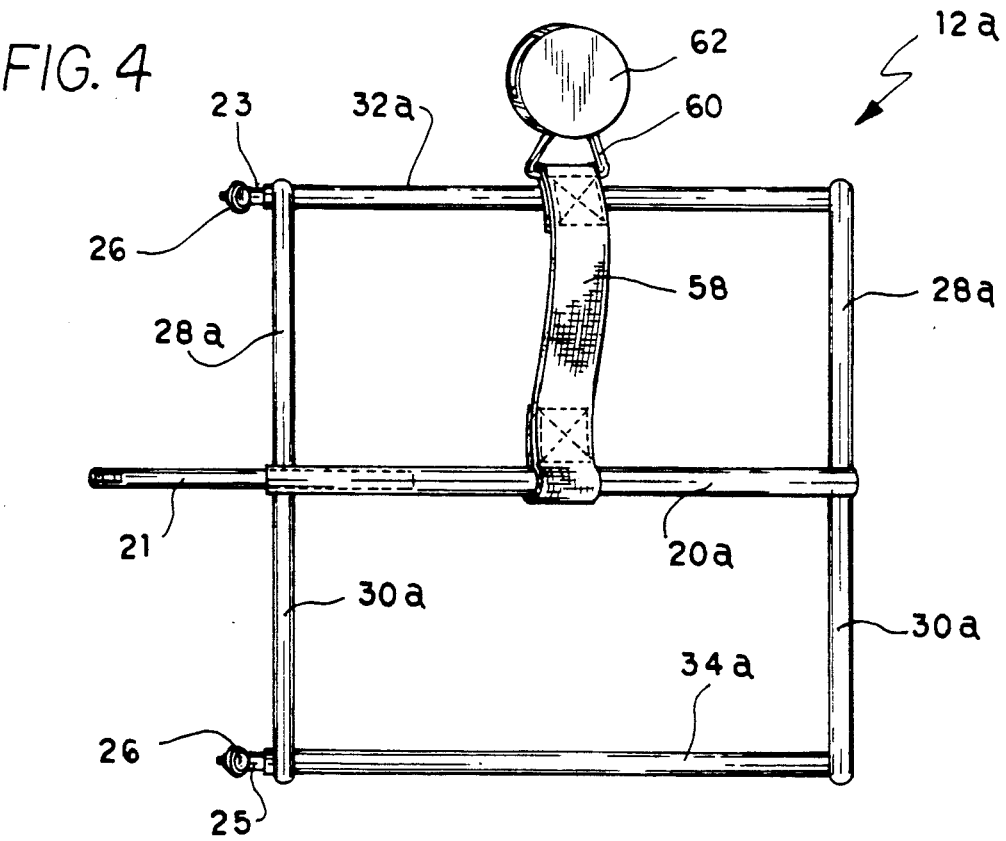

CHILD SAFETY SEAT ADAPTABLE TO AIRCRAFT SEAT ATTACH POINTS

FIELD OF THE INVENTION

This invention relates generally to portable and temporarily installable vehicle seats for infants and children, and more specifically to a seat which provides for such temporary installation by means of the existing passenger seat or cargo tiedown tracks or installation points found in most commercial and air carrier aircraft.

BACKGROUND OF THE INVENTION

Federal Aviation Regulations based upon the Federal Aviation Act of 1958 generally require passengers and crew to be restrained in their seats by seat belts for all takeoffs and landings. However, this regulation further allows infants and small children under the age of two years to be held by an adult during takeoffs and landings, or at other times when passengers might be required to use their seat belts.

Experience has shown by means of several air carrier accidents that the deceleration forces imposed are frequently sufficient to cause such children being held by adults to be thrown from the grasp of the adult, no matter how securely that adult may believe himself or herself to be holding the child. It will be appreciated that a child two years of age may weigh on the order of twenty five pounds or more, and the otherwise survivable deceleration forces may reach twenty times the force of gravity (20 G's) or more. The resulting force imposed by a 25 pound child at 20 G's will be seen to be the equivalent of 500 pounds, which force very few adults would be able to restrain when such force is suddenly imposed, as in the case of an aircraft accident.

Child restraint seats for automobiles have been known for many years, and in fact are required by law in many areas for small children riding in passenger cars. However, as noted above such restraint seats are not required in aircraft, even though the typical speeds and potential forces involved in aircraft accidents are much higher than in automobiles. One reason for the lack of a requirement for such child or infant safety seats in air carrier aircraft is that such seats require the use of a standard passenger seat, which precludes the use of that seat for a full fare adult passenger. Many families would use alternate means of transportation rather than paying full fare for a small child which may be easily held in the arms of a parent. Thus, there has been little economic incentive to provide such safety seats for small children and infants traveling by air. An argument has also been raised that in the case of families using other means of transportation, the chances of injury or death for such family members (including infants and small children) are statistically greater than if those families traveled by air. Thus, the effective act of discouraging a family from traveling by air due to the cost of an extra full seat for an infant, might be seen as endangering that family and infant further as they take an alternative and more hazardous form of transportation.

While the restraint requirement is answered for persons of sufficient age and size to be restrained by the standard aircraft seat belt, the need arises for a restraint system for infants and other small children which is specifically adapted for use in aircraft, particularly air carrier aircraft. The restraint seat or system should be capable of being secured to the existing seat or cargo restraint tracks which are found in nearly all such aircraft in order to preclude the requirement for a passenger seat, or alternatively should be capable of being installed in a conventional aircraft seat and restrained by the standard seat belt arrangement should such an alternative be preferable. Further, the seat should be capable of being installed in a rearward facing direction When secured to the seat or cargo tiedown tracks of the aircraft, thus offering the additional protection Well known in such rearward facing seats.

DESCRIPTION OF THE RELATED ART

M. J. Grady U.S. Pat. No. 3,515,431 and K. Johansson U.S. Pat. No. 4,183,580 each disclose a vehicle safety seat for small children and/or infants, the seats each being mounted in a vehicle by means of specialized floor mounting brackets or fixtures. The mounting brackets or fixtures must be permanently attached to the floor or suitable vehicle structure in order to provide secure mounting for the safety seats. These devices do not readily lend themselves to use in aircraft, due to the regulatory requirements for the modification of the aircraft floor and/or structure for the installation of such mounting brackets, as well as the certification requirements for the mounting brackets themselves due to their nature as permanent components of the aircraft once they are installed.

D. F. Stafford U.S. Pat. No. 3,865,433; H. F. Von Wimmersperg U.S. Pat. No. 4,067,608; M. Converse U.S. Pat. No. 4,436,341; D. Kincheloe U.S. Pat. No. 4,500,135; D. E. Hall U.S. Pat. No. 4,627,659; K. E. Fligsten et al. U.S. Pat. No. 4,630,324; G. S. Ensign U.S. Pat. No. 4,674,800; and D. Friedman U.S. Pat. No. 4,804,230 each disclose safety seats or devices for use by small children and/or infants while traveling in vehicles, which seats or devices each require the use of existing vehicle seat belts or other restraints in order to be secured within an existing vehicle seat. Moreover, each provides for the carriage of the child or infant in a forward facing position, with the exception of the Friedman device. For the reasons stated above in the Background of the Invention, these devices do not provide the benefits and advantages of the present invention due to their need to be used in combination with an existing vehicle seat and thus the inability of that seat to be used for another passenger.

M. A Boyle U.S. Pat. No. 4,759,311 discloses a harness arrangement which secures an infant or small child to an adult. However, no additional protection is provided to the child by this arrangement, and the child is dependent upon the good judgment of the cooperating adult in restraining him or herself by means of existing seat belts or other restraints in order for this device to function properly.

Finally, R. E. Steward U.S. Pat. No. 4,900,086 discloses an infant or small child protective seat which is constructed as a part of an existing vehicle seat. This arrangement is also unsuited to the needs fulfilled by the present invention, due to the regulatory requirements for the modification of existing air carrier seats and the need to devote the entire seat to the device when a small child or infant is using it.

None of the above noted patents, either singly or in combination, are seen to disclose the specific arrangement of concepts disclosed by the present invention.

SUMMARY OF THE INVENTION

By the present invention, an improved safety seat for the carriage of a small child or infant during travel in an aircraft is disclosed.

Accordingly, one of the objects of the present invention is to provide an improved safety seat for the carriage of small children and infants, which seat is attachable to the existing seat or cargo tiedown tracks in the floor of an aircraft by means of existing securing devices well known in the art.

Another of the objects of the present invention is to provide an improved safety seat which may be secured to existing aircraft floor tracks in a rearward or a forward facing direction as circumstances may allow or require.

An additional object of the present invention is to provide an improved safety seat which naturally provides some protection from typical hazards occurring in aircraft accidents, such as loose objects, smoke inhalation, etc.

Another object of the present invention is to provide an improved safety seat which does not require the use of an existing seat.

It is also an object of the present invention to provide an improved safety seat which allows the child contained therein and an adult in an existing seat to face one another.

A further object of the present invention is to provide an improved safety seat which also provides sufficient versatility to be used in combination with the existing seats and seat belts or other restraints in an aircraft, automobile or other vehicle should the occasion arise.

Yet another of the objects of the present invention is to provide an improved safety seat which in at least one embodiment is foldable to a relatively small size for ease of storage in an overhead storage bin or other compartment of an air carrier aircraft or other vehicle.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 3 is a bottom view of the present invention disclosing further structural details and alternative features.

FIG. 4 is a bottom view of an alternative embodiment of the present invention disclosing further alternatives.

Similar reference characters designate corresponding parts throughout the several figures of the drawings.

DESCRIPTION OF THE PREFERRED EMBODIMENT

Figure 1:
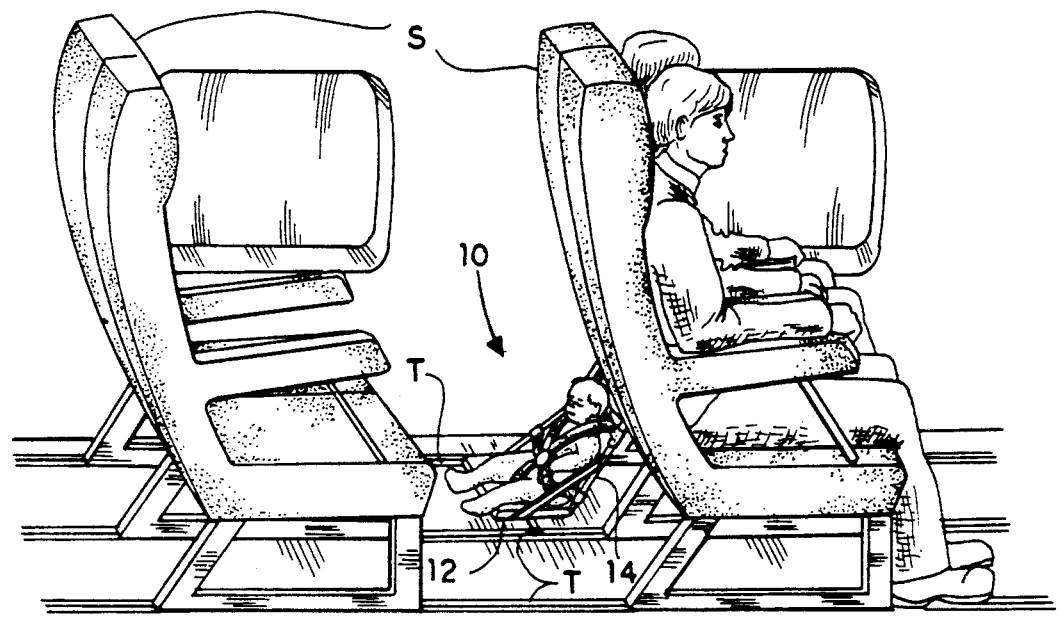
FIG. 1 is a perspective view of the present invention showing its various components and features.

Referring now to the drawings, particularly FIG. 1 of the drawings, the present invention will be seen to relate to a safety seat 10 for the carriage of an infant or small child, which seat 10 may be secured within the seat attachment or cargo tiedown tracks T of an aircraft or other vehicle so configured. Generally, such tracks T are installed with a standard distance between each track T as required by the standard seats S used in the industry, and are installed with their top surfaces substantially flush with the surface of the surrounding floor or carpet. Seat 10 is formed to make advantageous use of these standards, but in a modification of the basic invention may provide adjustability for nonstandard track widths.

Seat 10 is comprised generally of a bottom portion 12 and a back portion 14. Bottom 12 supports an overlying cushion 16 in the conventional manner, while back portion 14 may also include a back cushion 18. The various structural components of seat 10 described herein may be formed of any suitable materials, such as square or round tubular steel members as are commonly used in the aircraft industry. Other materials, such as fiber composites or aluminum, may also be used. The exact material used is not critical, so long as it provides the relatively high strength required without excessive weight. Preferably, all of the materials used in seat 10 will meet or exceed the standards for combustion resistance required in the aircraft industry for such components. Obviously the materials described above and indicated in the various drawing figures for the structure of seat 10 will be seen to provide for a rigid structure and a rigid positive attachment means for the structure of seat 10 to any tracks T to which seat 10 may be secured.

FIG. 3 discloses various details of the construction of seat bottom 12. A central transverse structural member 20 has ends 22 and 24 which extend beyond the lateral edges of seat bottom 12. Ends 22 and 24 are equipped with anchors 26 which are formed to cooperate with seat tracks T in order to secure seat 10 to the tracks T, as will be explained further below. While end 22 of transverse member 20 is fixed relative to the remainder of seat bottom 12, an alternative embodiment provides for variable lateral spacing between ends 22 and 24 of member 20. By forming member 20 of a hollow tube and providing end 24 with an outer diameter capable of fitting within the inner diameter of member 20, end 24 containing one anchor 26 may be made to telescope within member 20 and thereby provide for adjustment of the distance between anchors 26 and any variation in the distance between tracks T. It will be appreciated that due to standardization in the industry, such adjustment will not often be needed, but the provision for telescoping end 24 within member 20 will allow for the occasional nonstandard track width when such nonstandard width occurs.

Bottom member 20 also provides attachment for forward bottom extensions 28 and rearward bottom extensions 30 which define the lateral edges of seat bottom 12. Bottom extensions 28 and 30 are rigidly attached to central transverse bottom member 20 and serve as attachment and support members for bottom cushion 16. Should greater structural strength and rigidity be desired, forward and rear transverse members 32 and 34 may be added respectively between the forward and rear ends of forward and rearward bottom extensions 28 and 30.

Figure 5:
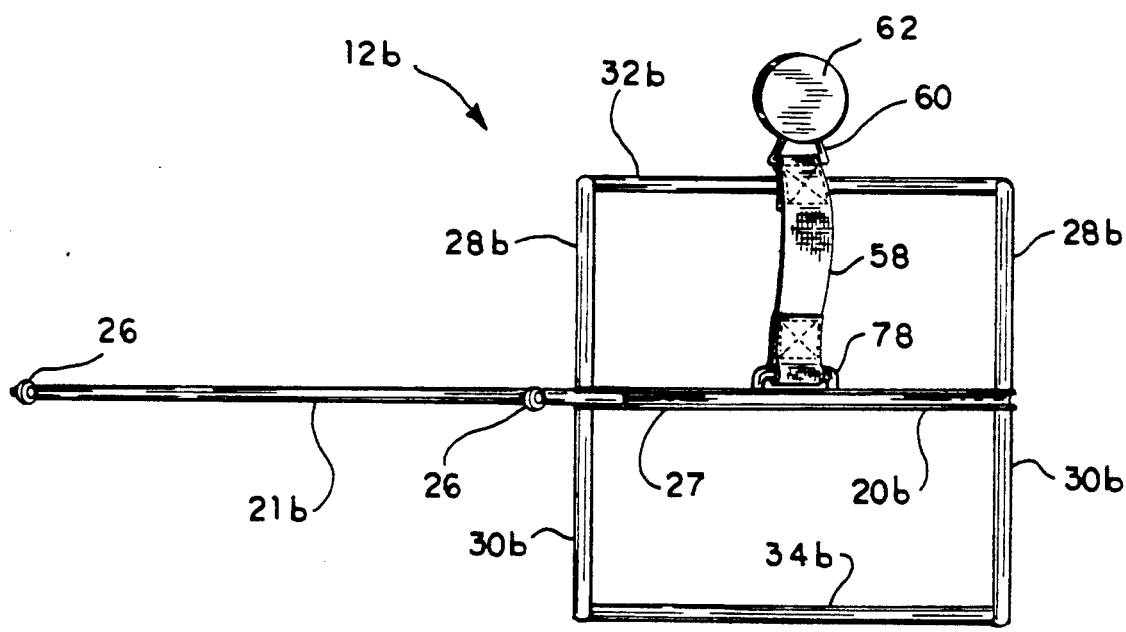
FIG. 5 is an additional bottom view showing yet another alternative construction for the bottom of the present invention.

FIGS. 4 and 5 respectively disclose additional alternative seat bottom structures 12a and 12b for seat 10. The seat bottom 12a shown in FIG. 4 provides for the mounting of seat 10 using only a single track T, where it is inconvenient or not possible to secure seat 10 using two laterally spaced tracks T. In the embodiment of FIG. 4, it will be seen that forward and rearward transverse members 32a and 34a are respectively equipped with ends 23 and 25, which ends 23 and 25 are provided with anchors 26 in the manner of fixed and telescoping ends 22 and 24 of seat bottom 12 of FIG. 3.

Figure 2:
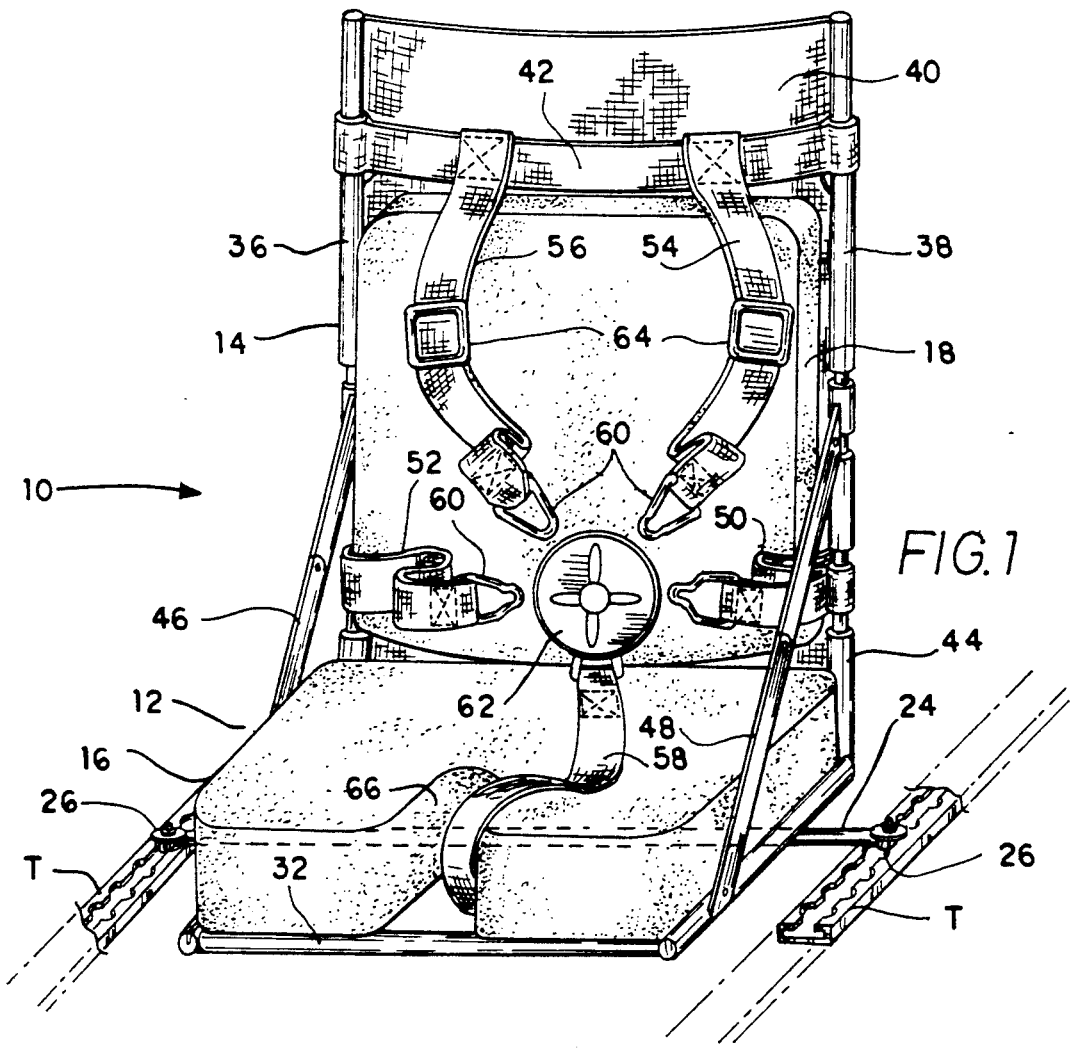
FIG. 2 is a perspective view of the present invention showing a preferred installation.

Ends 23 and 25, being attached to only one lateral edge of seat bottom 12a, will provide the required longitudinal and lateral security for seat 10. However, it will be seen that a seat 10 equipped with a seat bottom 12a might be subject to tipping and/or undue stress upon anchors 26, due to the lack of provision for securing the opposite ends of members 32a and 34a. The tubular nature of central transverse bottom member 20a may provide for an extendible lateral stabilizing member 21, which stabilizing member 21 may be extended from transverse member 20a in order to prevent the tipping of a seat 10 equipped with a seat bottom 12a from tipping due to the provision of anchors 26 on a single side of seat bottom 12a. Other provisions of seat bottom 12a for the attachment of additional members 32a and 34a, as well as crotch strap 58 and associated buckle end 60 and central buckle 62, are similar to the arrangement disclosed in the discussion of seat bottom 12 of FIG. 2.

The seat bottom 12b shown in FIG. 5 discloses a further alternative construction for such a seat bottom, which allows a seat 10 equipped with such a seat bottom 12b to be positioned other than directly between the attachment tracks T to which seat 10 is secured. In the embodiment shown in FIG. 5, central transverse member 20b is provided with a slot 27 which extends along the bottom of member 20b along its entire length. Telescopingly extendible and retractable member 21b cooperates with transverse member 20b and includes anchors 26 at each end. Anchors 26 are preferably installed along member 21b with spacing to provide for the anchoring of member 21b, and thus seat bottom 12b and seat 10, to adjacent seat tracks T. The construction disclosed for the seat bottom 12b of FIG. 5 thus allows seat 10 to be repositioned laterally relative to any seat tracks T to which member 21b may be secured, in order to provide optimum placement for seat 10. Slot 27 provides clearance for anchors 26 as member 21b is extended from or retracted into member 20b. A plurality of spaced apart holes (not shown) in member 21b provide for the selective positional securing of member 21b relative to member 20b, and thus seat bottom 12b and seat 10, by means of a pip pin P or other securing means. Other structural components of seat bottom 12b are similar to those described for seat bottoms 12 and 12a of FIGS. 3 and 4.

Returning to FIG. 1, back assembly 14 will be seen to have two lateral upright members 36 and 38 extending upward from the rear portions of rear transverse members 34. A back support panel 40 of flexible web or other suitable material is provided to extend between members 36 and 38. For additional structural strength of back portion 40, an upper transverse member 42 may be included between upright members 36 and 38.

Preferably, seat 10 may be partially disassembled or folded in order to provide for more compact storage when not in use. This may b ®accomplished by means of lower seat back fittings 44 which provide for the telescoping insertion of lateral upright back members 36 and 38 in the manner of telescoping end 24 of transverse bottom member 20, or by other suitable means such as hinges or other pivots, not shown. For further rigidity. Diagonal side braces 46 and 48 may be installed respectively between back members 36 and 38 and forward bottom extensions 28; pip pins, bolts or other attachment means may be used as desired. Side braces 46 and 48 provide further benefits as will be further described below.

Seat 10 is preferably equipped with a five point harness system, comprised of a left and right seat belts 50 and 52, left and right shoulder harnesses 54 and 56, and a crotch strap 58, each of which have buckle ends 60 affixed which may be revocably secured within a central buckle 62. Adjustment of the lengths of the various belts and straps may be provided by means of adjustment buckles 64. Such belt systems are generally accepted to provide the optimum restraint possible, particularly in the event of an accident. Seat belts 50 and 52 may be affixed to the lower ends of upright back members 36 and 38, while shoulder harnesses 54 and 56 may be affixed to upper transverse member 42. Crotch strap 58 may be secured to central transverse bottom member 20 beneath cushion 16, and pass upward through the front slot 66 provided in cushion 16 for optimum restraint. Alternatively, crotch strap attachment member 68 may be provided on slotted transverse member 20b for seat bottom 12b as shown in FIG. 5. This alternative precludes any interference due to the attachment end of crotch strap 58 around slotted member 20b as extendible member 21b and associated anchors 26 are extended from or retracted within slotted member 20b.

Seat 10 may be used by unfolding or assembling back portion 14 with bottom portion 12 as described above, and connecting side braces 46 and 48 between upright back members 36 and 38 and forward bottom extensions 28. Seat 10 may then be secured to tracks T by inserting anchors 26 at the ends 22 and 24 of transverse bottom member 20 into tracks T. Such anchors 26 are well known in the art, and generally are spring loaded in order to retain such anchors 26 at the desired location within track T when the user releases the spring pressure. Thus, the resulting position of seat 10 may be arranged within an inch or so depending upon the spacing of the retaining points within tracks T. If tracks T are spaced at other than a standard distance apart, telescoping end 24 of transverse member 20 may be extended as required in order to provide the proper lateral spacing between ends 22 and 24, and thus anchors 26. The alternative constructions disclosed above and shown in FIGS. 4 and 5 may be installed according to the specific constructions described above which enable such installation.

Preferably, seat 10 is positioned facing rearward directly in front of the standard seat S which is occupied by the parent or guardian of the child seated in seat 10. The parent/guardian and seat 10 With child will preferably be positioned away from any aisle in order that other passengers will not be blocked by seat 10. However, it will be obvious that the exact positioning of seat 10 is up to the persons involved, and other arrangements may be found to be more suitable at various times. For example, rearward facing standard seats are known in aircraft, and for this reason it may be desirable to install seat 10 facing forward in order that a parent/guardian using such rearward facing seats may directly face a child seated in seat 10. The anchoring arrangement provided by seat 10 allows for such variations in placement with equal security for seat 10. It will be seen that seat 10 may even be installed within an existing standard seat S by retracting any extendible members 21, 21b or 24 and placing seat 10 within seat S and securing the seat belt for seat S around the lower seat back fittings 44 in order to retain seat 10 within a seat S. Such an arrangement might be desirable when using an automobile or other transportation in which suitable seat tracks T are not available.

Once seat 10 has been installed, a child may be seated in seat 10 and secured by adjusting buckles 64 and attaching end buckles 60 for the various belts and harnesses 50, 52, 54, 56, and 58 within central buckle 62. As noted above, seat 10 is preferably positioned facing rearward and facing a parent/guardian seated in an existing seat S. This arrangement provides several benefits not offered by any of the presently known child safety seats First, the parent or guardian may more easily see the child and react more quickly to any needs the child may have. Second, the child may watch the parent/guardian more easily; it is generally accepted that small children will not become bored or cranky so readily if they can interact with another person, particularly a person whom they know. Third, the safety factor provided by the rearward facing seat in the event of an accident is much greater than that offered by conventional forward facing seats, either those for adults or for children. Fourth, the child is better protected from loose objects in the event of an accident, by the body of the adult over him or her (standard procedure in such an event is to lean forward toward the seat back immediately in front), and the fact that the legs of the adult will pass to either side of seat 10 in the preferred installation. Side braces 46 and 48 will tend to prevent the incursion of the legs of an adult or other objects into the space occupied by seat 10 and any child seated within. Fifth, in the event of fire the positioning of the child adjacent to the floor will tend to provide the child with better air to breathe and cooler temperatures, as both the heat and fumes from such a fire will tend to rise; thus, survivability for a child seated in a seat 10 so installed will be enhanced. And finally, the positioning of the child immediately in front of and facing the parent/guardian enables the parent/guardian to more quickly release the child from the restraining harness or buckle 62 in order to more rapidly exit the aircraft. The release procedure is much more easily accomplished in the above scenario than if the adult were required to turn 90 degrees or more to the side and reach across a child seated in an adjacent seat.

When the trip requiring the use of seat 10 has been accomplished, the child seated therein may be easily and quickly removed by unfastening central buckle 62 or other securing means and detaching seat 10 from seat tracks T. Seat 10 may then be folded, or the back portion 14 removed from the bottom portion 12, and seat 10 stored until further needed. Alternatively, it is anticipated that some travelers may provide their own seat 10 for their child; it is apparent from the foregoing that such a seat 10 may also be used in the conventional manner in other vehicles by securing an existing seat belt around the structure of seat 10, as briefly described above. Thus, the parent/guardian of a child may use seat 10 on a regular basis for transporting the child in their own automobile or other conveyance, and supply their own seat 10 for occasions when traveling by commercial or other air carrier.

It is to be understood that the present invention is not limited to the sole embodiment described above, but encompasses any and all embodiments within the scope of the following claims.

I claim:

1. A portable, temporarily installable and removable safety seat for the seating of an infant or small child in an aircraft,
    said seat having rigid positive securing means comprising at least a pair of lateral anchors directly securable to existing tiedown tracks in the floor of an aircraft, said seat including a bottom portion and a back portion, said lateral anchors being affixed to and extending beyond the limits of said seat bottom portion, each of said lateral anchors being dimensioned and configured to interengage existing tiedown tracks in the floor of the aircraft, whereby
    said seat may be temporarily and directly secured to the existing tiedown tracks.

2. A portable, temporarily installable and removable safety seat for the seating of an infant or small child in an aircraft,
    said seat having anchors cooperating with existing tiedown tracks in the floor of said aircraft,
    said seat including a bottom portion and a back portion,
    said bottom portion having a central transverse member with ends including anchors providing for securing to said existing tiedown tracks,
    forward and rearward extensions affixed adjacent each said ends of said central transverse member,
    a forward and a rearward transverse member each respectively affixed between said forward and said rearward extension,
    said central transverse member and said forward and rearward extensions providing for the support and attachment of a bottom cushion,
    said back portion comprised of two upright members extending from said rearward extensions and having an upper transverse member and back support panel extending therebetween,
    said back portion providing for the support and attachment of a back cushion, and
    diagonal side braces extending from each said upright member to each corresponding said forward bottom extension, whereby said seat may be temporarily secured to said existing tiedown tracks.

3. The seat of claim 2 wherein;
    said back portion is foldable relative to said seat portion.

4. The seat of claim 2 wherein;
    each said bottom portion rearward extension includes a lower seat back fitting,
    said lower seat back fittings providing for the telescoping insertion and removal of said back portion upright members.

5. The seat of claim 2 including;
    a restraining harness assembly for the restraint of said infant or child seated thereupon.

6. The seat of claim 5 wherein;
    said restraining harness is comprised of left and right seat belt portions, left and right shoulder harness portions, and a crotch strap,
    each said belt portions, harness portions, and strap cooperating with a central securing buckle.

7. The seat of claim 2 wherein;
    said bottom portion central transverse member includes at least one end telescopically extendible therefrom,
    thereby providing for laterally adjustable spacing between said transverse member ends including said anchors.

8. The seat of claim 2 including;

a bottom portion and a back portion, said bottom portion having a central transverse member, forward and rearward extensions affixed adjacent each said ends of said central transverse member, a forward and a rearward transverse member each respectively affixed between said forward and said rearward extension, each said forward and rearward transverse member having at least one end including an anchor providing for securing to one said existing tiedown track, said central transverse member and said forward and rearward extensions providing for the support and attachment of a bottom cushion, said back portion comprised of two upright members extending from said rearward extensions and having an upper transverse member and back support panel extending therebetween, said back portion providing for the support and attachment of a back cushion, and diagonal side braces extending from each said upright member to each corresponding said forward bottom extension.

9. The seat of claim 8 wherein;

said back portion is foldable relative to said seat portion.

10. The seat of claim 8 wherein;

each said bottom portion rearward extension includes a lower seat back fitting, said lower seat back fittings providing for the telescoping insertion and removal of said back portion uptight members.

11. The seat of claim 8 including;

a restraining harness assembly for the restraint of said infant or child seated thereupon.

12. The seat of claim 11 wherein;

said restraining harness is comprised of left and right seat belt portions, left and right shoulder harness portions, and a crotch strap, each said belt portions, harness portions, and strap cooperating with a central securing buckle.

13. The seat of claim 8 wherein;

said central transverse member includes a telescoping stabilizing member, thereby providing lateral stability for said seat.

14. The seat of claim 2 including;

a bottom portion and a back portion, said bottom portion having a slotted central transverse member with two ends, said slotted central transverse member having an extension telesopingly extendible from either said ends, said extension having two ends each including an anchor providing for securing to said existing seat or cargo tiedown tracks, forward and rearward extensions affixed adjacent each said ends of said slotted central transverse member, a forward and a rearward transverse member each respectively affixed between said forward and said rearward extension, said slotted central transverse member and said forward and rearward extensions providing for the support and attachment of a bottom cushion, said back portion comprised of two upright members extending from said rearward extensions and having an upper transverse member and back support panel extending therebetween, said back portion providing for the support and attachment of a back cushion, and diagonal side braces extending from each said upright member to each corresponding said forward bottom extension.

15. The seat of claim 14 wherein;

said back portion is foldable relative to said seat portion.

16. The seat of claim 14 wherein;

each said bottom Portion rearward extension includes a lower seat back fitting, said lower seat back fittings providing for the telescoping insertion and removal of said back portion upright members.

17. The seat of claim 14 including;

a restraining harness assembly for the restraint of said infant or child seated thereupon.

18. The seat of claim 17 wherein;

said restraining harness is comprised of left and right seat belt portions, left and right shoulder harness portions, and a crotch strap, each said belt portions, harness portions, and strap cooperating with a central securing buckle.

19. A method of installing a portable, temporarily installable and removal safety seat for the seating of an infant or small child in an aircraft having standard passenger seats said safety seat having restraining belts for said infant or child seated thereupon and anchors cooperating with existing tiedown tracks in the floor of said aircraft, the method including the following steps:

positioning said safety seat immediately in front of said standard passenger seat in a manner that said infant or child seated in said safety seat and a person seated in said standard seat would face one another, securing said safety sat to said tiedown tracks by means of said cooperating anchors, placing said infant or child upon said safety seat and restraining said infant or child by means of said safety seat restraining belts, and seating said passenger upon said standard passenger seat with the legs of said passenger extending to either side of said safety seat and said infant or child seated thereupon.

* * * * *